United States Patent [19]

Hara et al.

[11] Patent Number: 5,130,075
[45] Date of Patent: Jul. 14, 1992

[54] METHOD FOR PRESS MOLDING THERMOPLASTIC RESIN

[75] Inventors: Takahisa Hara, Hyogo; Masahito Matsumoto, Osaka; Nobuhiro Usui, Osaka; Shigeyoshi Matsubara, Osaka, all of Japan

[73] Assignee: Sumitomo Chemical Co., Ltd., Osaka, Japan

[21] Appl. No.: 765,200

[22] Filed: Sep. 25, 1991

[30] Foreign Application Priority Data

Sep. 28, 1990 [JP] Japan ................................. 2-262669

[51] Int. Cl.⁵ .............................................. B29C 45/56
[52] U.S. Cl. ...................................... 264/328.7; 264/2.2
[58] Field of Search .................. 264/40.1, 40.5, 328.7, 264/2.2, 328.12, 328.11, 331.19, 330, 331.11; 425/150, 575, 590

[56] References Cited

U.S. PATENT DOCUMENTS 4,489,033 12/1984 Uda et al. .......................... 264/328.7
4,707,321 11/1987 Segawa et al. ..................... 264/328.7

Primary Examiner—Jill L. Heitbrink
Attorney, Agent, or Firm—Birch, Stewart, Kolasch & Birch

[57] ABSTRACT

A molded article of a thermoplastic resin having good appearance is molded with a pair of molds having a conduit for supplying a resin melt in one of the molds by closing the molds till a mold cavity clearance in a closing direction reaches a specific distance, opening the molds at a specific rate while starting supply of the resin melt into the mold cavity before the clearance reaches the thickness of the finally produced article, continuing opening of the molds while supplying the resin melt till the cavity clearance becomes larger than the thickness of the finally produced article, and closing the molds at a specific rate before or when resin supply is finished to mold and cool the supplied resin melt.

3 Claims, 1 Drawing Sheet

METHOD FOR PRESS MOLDING THERMOPLASTIC RESIN

BACKGROUND OF THE INVENTION

1. Field of the Invention

The present invention relates to a method for press molding a thermoplastic resin. More particularly, the present invention relates to a method for efficiently press molding a thermoplastic resin to obtain a molded article having good appearance and less deformation or warp in a shorter molding cycle.

2. Description of the Related Art

To produce a molded article of a thermoplastic resin, there are known press molding comprising pressing and cooling a plasticized resin melt in a mold and injection molding comprising supplying a resin melt in a closed mold.

However, each of the conventional molding methods has the following drawbacks.

First, in the former press molding method, a nozzle for supplying the plasticized thermoplastic resin should be inserted in and removed from the mold in each molding cycle, so that the molding cycle becomes longer. In the press molding, since it takes a long time from start of the resin melt supply to start of the molding by a pressing pressure, uneven gloss or small wrinkles tend to be formed on a surface of the molded article.

In the latter injection molding method, since the resin melt is supplied under pressure into a cavity of the closed mold, orientation of the resin is generated and residual strain remains in the molded article, so that the molded article tends to suffer from deformation such as twisting or distortion. In addition, since large residual strain remains at a part of the molded article near a gate of the mold, such part is physically weak.

SUMMARY OF THE INVENTION

An object of the present invention is to provide a press molding method which can produce a molded article having good appearance and less deformation or warp.

According to the present invention, there is provided a method for press molding a thermoplastic resin using a pair of molds having a conduit for supplying a resin melt in one of the molds comprising steps of:

(a) closing the molds till a clearance of a cavity formed by said molds in a mold closing direction reaches a distance which is smaller than a thickness of a finally produced article, (b) opening said molds at a rate of not larger than 40 mm/sec. and starting supply of said resin melt into said mold cavity through said conduit before said clearance reaches the thickness of the finally produced article, (c) continuing opening of said molds while supplying said resin melt till said cavity clearance becomes larger than the thickness of the finally produced article, and (d) closing said molds at a rate of 30 mm/sec. or lower before or when resin supply is finished to mold and cool said supplied resin melt.

DETAILED DESCRIPTION OF THE DRAWINGS

The present invention will be explained by making reference to the accompanying drawings.

Figure 1:
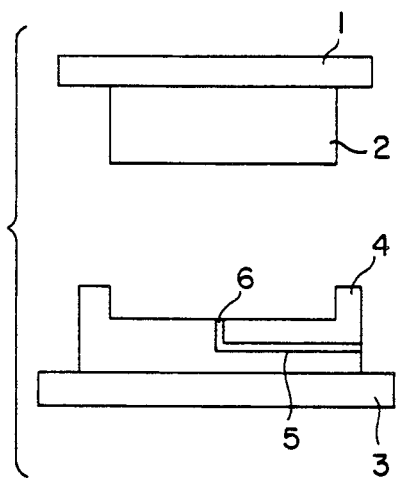
FIGS. 1 and 2 show cross sections of an embodiment of the molds to be used in the press molding according to the present invention.
Figure 2:
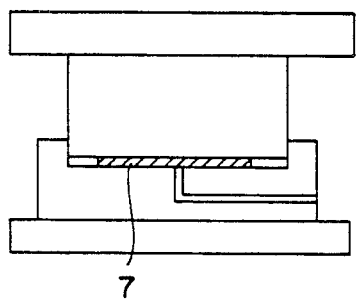

Referring to FIGS. 1 and 2, the molds comprises an upper mold 2 and a lower mold 4. The upper mold 2 is attached to an upper platen 1 and moved vertically by a hydraulic pressure or a motor. The lower mold 4 is attached to a lower platen 3 and has a resin conduit 5 and an opening 6 for supplying the resin melt.

The resin conduit 5 is connected to means (not shown) for plasticizing and supplying a thermoplastic resin 7. To the opening 6, a valve (not shown) which opens when the resin melt is supplied and closes when the resin melt is not supplied can be provided.

Figure 3:
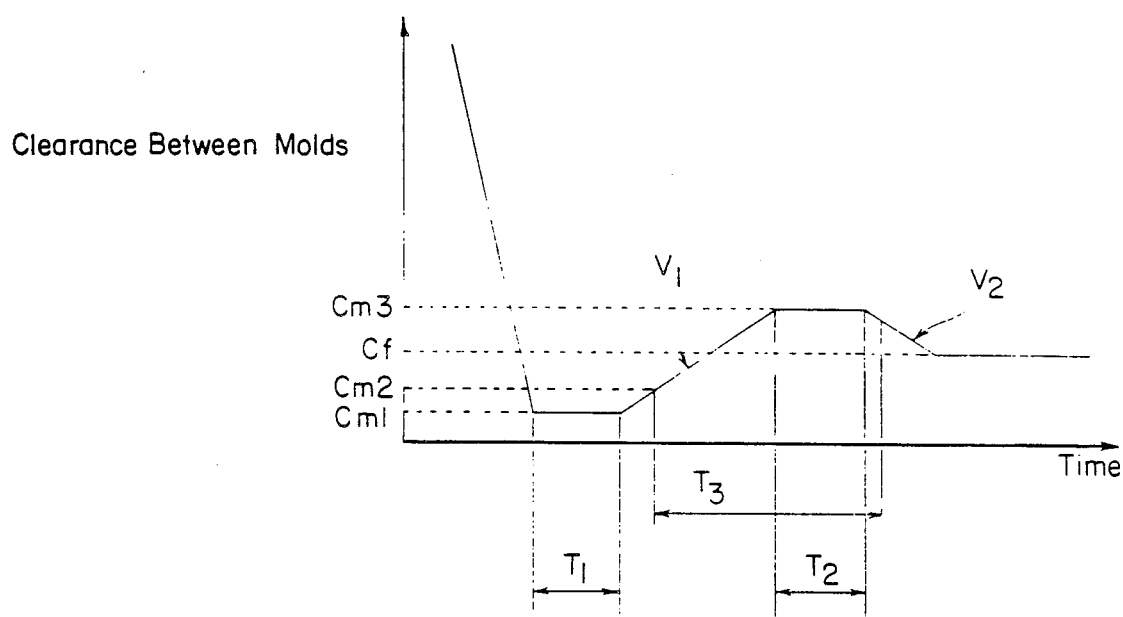
FIG. 3 is a graph showing a relationship between a cavity clearance of the molds and molding time in the steps of the press molding according to the present invention.

The method of the present invention can be carried out using the above described apparatus as follows:

The upper mold 2 is lowered and temporarily stopped when a clearance ($C_{m1}$) between the upper and lower molds 2, 4 is smaller than the thickness ($C_f$) of the finally produced article (see FIG. 3).

The upper mold 2 is lifted at a rate ($V_1$) of 40 mm/sec. or lower and simultaneously the resin melt 7 is supplied through the conduit 5 and the opening 6. In this step, the timing of the start of resin supply is important. That is, a clearance between the molds is smaller than the thickness ($C_f$) of the finally produced article ($C_{m2}$: a clearance at the start of resin supply). Then, while the resin melt is supplied, the upper mold 2 is further lifted up till the clearance of the molds becomes larger than the thickness ($C_f$) of the finally produced article.

Then, before or when the resin supply is finished, the upper and lower molds are closed at a rate ($V_2$) of 30 mm/sec. or lower to press mold the resin melt.

In FIG. 3, time periods $T_1$ and $T_2$ when the upper mold 2 is stopped are not critical. $T_1$ is preferably as short as possible in view of the molding cycle. Though $T_2$ may be 0 (zero), it is adjusted so that the reclosing of the molds starts before or when the resin supply is finished.

The rate $V_1$ is not necessarily constant and may be changed during the lifting of the upper mold insofar as it does not exceeds 40 mm/sec.

In FIG. 3, $T_3$ indicates a time for supplying resin, and $C_{m3}$ indicates a clearance when the mold opening is stopped.

As the thermoplastic resin, any one of thermoplastic resins which are conventionally used in press molding, injection molding or extrusion molding may be used. The thermoplastic resin includes foamable or non-foamable resins such as polypropylene, polyethylene, polystyrene, acrylonitrile-styrene-butadiene block copolymers, polyamide (e.g. Nylon) and the like. The thermoplastic resin may contain an additive such as a filler (e.g. inorganic filler, glass fiber, etc.), a pigment, a lubricant and an antistatic agent.

EXAMPLE 1

Using a vertical type press molding machine having a horizontal injection part and a clamping force of 30 tons, a molding test was carried out.

Molds consisted of a convex upper mold and a concave lower mold. The lower mold was a disc shape mold having a diameter of 300 mm and, at its center part, an opening of 3 mm in diameter for directly supplying the resin melt in the mold cavity. Since a clearance between the upper and lower molds was freely adjusted, a thickness of a molded article depended on an amount of the supplied resin melt. In this Example, the thickness of the finally produced article was 1.0 mm. Using a polypropylene resin (Sumitomo Noblen (trademark) AY 564, melt flow index of 15 g/10 min.) as a thermoplastic resin, molding was carried out under the following conditions.

The upper mold was lowered till the clearance $C_{m1}$ reached 0.3 mm, stopped for 0.5 sec. and then lifted at a rate of 2 mm/sec. When the clearance reached 0.6 mm, the supply of the resin melt was started. When the clearance reached 2 mm, the upper mold was stopped for 0.2 seconds. Thereafter, the upper mold was again lowered at a rate of 5 mm/sec. to close the molds. The resin supply time was 1 (one) second.

The appearance of the molded article was good and had neither uneven gloss due to cold slags nor flow marks. A degree of deformation was 0.2 mm.

The degree of deformation was measured as follows

A sample of the molded article was placed on a plate, and a peripheral part of the article which was not contact to the plate was pressed. Then, a distance from the plate surface to a part of the article which was most largely separated from the plate was measured and recorded as a degree of deformation.

EXAMPLE 2

In the same manner as in Example 1 except that the upper mold was lifted at a rate of 20 mm/sec. and the resin melt was supplied for 0.4 second, a molded article was produced. The appearance of the molded article was good and had neither uneven gloss nor flow marks. A degree of deformation was 0.3 mm.

EXAMPLE 3

In the same manner as in Example 1 except that the upper mold was lifted at a rate of 40 mm/sec. and the resin melt was supplied for 0.4 second, a molded article was produced. The appearance of the molded article was good and had neither uneven gloss nor flow marks. A degree of deformation was 0.2 mm.

EXAMPLE 4

In the same manner as in Example 1 except that the upper mold was closed at a rate of 15 mm/sec. and the resin melt was supplied for 0.92 second, a molded article was produced. The appearance of the molded article was good and had neither uneven gloss nor flow marks. A degree of deformation was 0.7 mm.

EXAMPLE 5

In the same manner as in Example 1 except that the upper mold was closed at a rate of 30 mm/sec. and the resin melt was supplied for 0.92 second, a molded article was produced. The appearance of the molded article was good and had neither uneven gloss nor flow marks. A degree of deformation was 0.7 mm.

Comparative Example 1

In the same manner as in Example 1 except that the upper mold was lifted till the clearance reached 1.2 mm which was larger than the thickness of the finally produced article, stopped for 0.5 second and then lifted at a rate of 1.0 mm/sec. and the supply of the resin melt was started when the clearance reached 1.3 mm, a molded article was produced. The appearance of the molded article was not good and had uneven gloss. A degree of deformation was 0.2 mm.

Comparative Example 2

In the same manner as in Example 1 except that the supply of the resin melt was started when the clearance was 1.2 mm which was larger than the thickness of the finally produced article and the resin melt was supplied for 0.7 second, a molded article was produced. The appearance of the molded article was not good and had uneven gloss. A degree of deformation was 0.2 mm.

Comparative Example 3

In the same manner as in Example 1 except that the upper mold was lifted at a rate of 42.5 mm/sec. and the resin melt was supplied for 0.33 second, a molded article was produced. The appearance of the molded article was not good and had uneven gloss. A degree of deformation was 0.3 mm.

Comparative Example 4

In the same manner as in Example 1 except that the upper mold was lowered till the clearance ($C_{m1}$) reached 1.0 mm, the resin melt was supplied for 1 second and the clearance was not changed till the finishing of the molding, a molded article was produced. The molded article had a large degree of deformation.

Comparative Example 5

In the same manner as in Example 1 except that the upper mold was closed at a rate of 38 mm/sec. and the resin melt was supplied for 0.92 second, a molded article was produced. The appearance of the molded article was not good and had uneven gloss and flow marks. A degree of deformation was 2.0 mm.

Comparative Example 6

The upper mold was stopped when the clearance reached 2 mm, after 0.5 second, the supply of the resin melt was started, and the upper mold was closed at a rate of 5 mm/sec. after 0.9 second from the start of the resin supply. The resin supply time was 1 second as in Example 1. Though a degree of deformation of the molded article was the same as the molded article produced in Example 1, the molded article had uneven gloss and flow marks at a part near the opening for resin supply.

The above molding conditions and the results are summarized in the Table.

TABLE

| Example No. | Shape of molded article | Clearance between upper and lower molds (mm) | | | | $V_1$ (mm/sec) | $V_2$ (mm/sec) | $T_1$ (sec) | $T_2$ (sec) | $T_3$ (sec) | Appearance | Degree of deformation (mm) |
| --- | --- | --- | --- | --- | --- | --- | --- | --- | --- | --- | --- | --- |
| | | $C_f$ | $C_{m1}$ | $C_{m2}$ | $C_{m3}$ | | | | | | | |
| 1 | Disc*1) | 1.0 | 0.3 | 0.6 | 2.0 | 2.0 | 5.0 | 0.5 | 0.2 | 1.0 | Good | 0.5 |
| 2 | ↑ | 1.0 | 0.3 | 0.6 | 2.0 | 20.0 | 5.0 | 0.5 | 0.2 | 0.4 | Good | 0.3 |
| 3 | ↑ | 1.0 | 0.3 | 0.6 | 2.0 | 40.0 | 5.0 | 0.5 | 0.2 | 0.4 | Good | 0.2 |
| 4 | ↑ | 1.0 | 0.3 | 0.6 | 2.0 | 2.0 | 15.0 | 0.5 | 0.2 | 0.92 | Good | 0.7 |
| 5 | ↑ | 1.0 | 0.3 | 0.6 | 2.0 | 2.0 | 30.0 | 0.5 | 0.2 | 0.92 | Good | 0.7 |

TABLE-continued

| Example No. | Shape of molded article | Clearance between upper and lower molds (mm) | | | | $V_1$ (mm/sec) | $V_2$ (mm/sec) | $T_1$ (sec) | $T_2$ (sec) | $T_3$ (sec) | Appearance | Degree of deformation (mm) |
| --- | --- | --- | --- | --- | --- | --- | --- | --- | --- | --- | --- | --- |
| | | $C_f$ | $C_{m1}$ | $C_{m2}$ | $C_{m3}$ | | | | | | | |
| C. 1 | ↑ | 1.0 | 1.2 | 1.3 | 2.0 | 1.0 | 5.0 | 0.5 | 0.2 | 1.0 | Uneven gloss | 0.2 |
| C. 2 | ↑ | 1.0 | 0.3 | 1.2 | 2.0 | 2.0 | 5.0 | 0.5 | 0.2 | 0.7 | ↑ | 0.2 |
| C. 3 | ↑ | 1.0 | 0.3 | 0.6 | 2.0 | 42.5 | 5.0 | 0.5 | 0.2 | 0.33 | ↑ | 0.3 |
| C. 4 | ↑ | 1.0 | 1.0 | 1.0 | 1.0 | — | — | 0.5 | — | 1.0 | Good | 30 |
| C. 5 | ↑ | 1.0 | 0.3 | 0.6 | 2.0 | 2.0 | 38.0 | 0.5 | 0.2 | 0.92 | Flow marks, Uneven gloss | 2.0 |
| C. 6 | ↑ | 1.0 | 2.0 | 2.0 | — | — | 5.0 | 1.4 | — | 1.0 | ↑ | 0.2 |

Note: [1] Having a diameter of 300 mm and a thickness of 1 mm.

What is claimed is:

1. A method for press molding a thermoplastic resin using a pair of molds having a conduit for supplying a resin melt in one of the molds comprising steps of:
   (a) closing the molds till a clearance of a cavity formed by said molds in a mold closing direction reaches a distance which is smaller than a thickness of a finally produced article,
   (b) opening said molds at a rate of not larger than 40 mm/sec. and starting supply of said resin melt into said mold cavity through said conduit before said clearance reaches the thickness of the finally produced article,
   (c) continuing opening of said molds while supplying said resin melt till said cavity clearance becomes larger than the thickness of the finally produced article, and
   (d) closing said molds at a rate of 30 mm/sec. or lower before or when resin supply is finished to mold and cool said supplied resin melt.

2. The method according to claim 1, wherein said thermoplastic resin is a resin selected from the group consisting of polypropylene, polyethylene, polystyrene, a acrylonitrile-styrene-butadiene block copolymer and polyamide.

3. The method according to claim 1, wherein said thermoplastic resin is polypropylene.

* * * * *